United States Patent

Buljan et al.

[11] Patent Number: 5,216,845
[45] Date of Patent: Jun. 8, 1993

[54] METHOD OF MACHINING NICKEL BASED SUPERALLOYS

[75] Inventors: Sergej-Tomislav Buljan, Acton; Helmut Lingertat, Dorchester; Steven F. Wayne, Scituate, all of Mass.

[73] Assignee: GTE Valenite Corporation, Troy, Mich.

[21] Appl. No.: 693,492

[22] Filed: Apr. 30, 1991

Related U.S. Application Data

[63] Continuation-in-part of Ser. No. 595,065, Oct. 10, 1990.

[51] Int. Cl.⁵ .............................................. B23B 1/00
[52] U.S. Cl. ....................................... 51/281 R; 82/1.11
[58] Field of Search ....................... 51/281 R, 325, 307, 51/309; 407/119; 408/1 R; 409/131, 132; 82/1.11, 47

[56] References Cited

U.S. PATENT DOCUMENTS

| | | | |
|---|---|---|---|
| 4,227,842 | 10/1980 | Samanta et al. | 51/309 X |
| 4,286,905 | 9/1981 | Samanta | 82/1.11 X |
| 4,323,325 | 4/1982 | Samanta et al. | 82/1.11 X |
| 4,352,308 | 10/1982 | Samanta et al. | 82/1.11 |
| 4,497,228 | 2/1985 | Sarin et al. | 82/1 C |
| 4,708,037 | 11/1987 | Buljan et al. | 82/1.11 |
| 4,919,718 | 4/1990 | Tiegs et al. | 75/232 |

FOREIGN PATENT DOCUMENTS 0062311 10/1982 European Pat. Off.
49-127806 12/1974 Japan.
2-071906 3/1990 Japan.

*Primary Examiner*—Bruce M. Kisliuk
*Assistant Examiner*—John A. Marlott
*Attorney, Agent, or Firm*—Frances P. Craig

[57] ABSTRACT

A method for machining a high temperature nickel based alloy workpiece or other difficult-to-work material. The method involves machining the workpiece at an effective cutting speed of up to about 1500 sfm per minute, moving a ceramic-metal cutting tool across the face of the workpiece at a rate of up to about 0.04 in/rev, and cutting the workpiece with the ceramic-metal cutting tool to effect a depth of cut of up to about 0.15 inches per pass. The ceramic-metal cutting tool has a density of at least about 95% of theoretical, and includes about 80–98%, preferably 88–96%, by volume of granular hard phases and about 2–20%, preferably 4–12%, by volume of a metal phase. The granular hard phases are (a) a major hard phase portion of alumina and (b) a minor hard phase portion of hard refractory metal carbides, nitrides, carbonitrides, and borides. The metal phase is combination of nickel and aluminum having a ratio of nickel to aluminum of from about 80:20 to about 90:10, preferably 85:15 to 88:12 by weight with optional additives. Preferably, the metal phase is non-continuous and dispersed, and at least a major portion of the metal phase is segregated at hard phase triple points.

24 Claims, 1 Drawing Sheet

METHOD OF MACHINING NICKEL BASED SUPERALLOYS

CROSS REFERENCE TO RELATED APPLICATIONS

This application is a continuation-in-part of commonly assigned, copending U.S. patent application Ser. No. 07/595,065 filed Oct. 10, 1990, now pending, by the same Applicants. This application is also related to commonly assigned, copending U.S. patent applications Ser. Nos. 07/576,241 filed Aug. 31, 1990, now abandonded; 07,/632,237, now U.S. Pat. No. 5,053,074 and 07/632,238, now U.S. Pat.No. 5,089,047, both filed Dec. 20, 1990; and 07/635,408 filed Dec. 21, 1990 now U.S. Pat. No. 5,041,261; all also by the same Applicants. Applications 07/595,065, 07/576,241, 07/632,237, 07/632,238, and 07/635,408 are incorporated herein by reference.

BACKGROUND OF THE INVENTION

This invention relates to a method of machining, and particularly to a method of machining suitable for high temperature nickel based metal alloys including the type known in the art as superalloys, as well as other difficult-to-work alloys based on iron and cobalt.

The high temperature nickel based superalloys, for example Inconel® alloys (available from Huntington Alloys, Inc., Huntington, W.Va.), present the advantages of deformation resistance and retention of high strength over a broad range of temperatures. Because of their high strength at elevated temperatures, however, these alloys are much more difficult to machine than steels.

Ceramic-metal (cermet) tools, which have greatly improved the productivity and efficiency of the metal removal process in steel machining, for the most part have not proven effective in machining of nickel based alloys. These cermet materials are based principally on refractory metal carbides or nitrides bonded with cobalt, nickel, molybdenum, or alloy binders. Commercially available cutting tools, for example cobalt cemented tungsten carbide, can be utilized for such machining only at relatively low cutting speeds and hence low productivity.

Attempts have been made to utilize alumina ceramics and alumina-based composites such as alumina-titanium carbide composites for use as cutting tools for high temperature nickel based superalloy machining. The use of this class of materials, however, has been restricted by their inherently low fracture toughness, limiting the usable feed rate and depth of cut. Alumina-silicon carbide whisker composites have provided some increase in fracture toughness, but the whisker component requires careful handling to assure safety and complete homogeneity in fabrication of the material.

Accordingly, it would be of great value to find a method suitable for machining difficult-to-work metals such as high temperature nickel based superalloys using a cutting tool which exhibits improved chemical wear resistance and performance when compared to conventional ceramic metal-cutting tool materials, improved fracture toughness compared to known alumina-titanium carbide composites, and improved ease of fabrication compared to alumina-silicon carbide whisker composite materials. The new and improved method described herein utilizes such a cutting tool.

SUMMARY OF THE INVENTION

In one aspect, the present invention is a method for machining involving machining a workpiece at an effective cutting speed of up to about 1500 surface feet per minute, moving a ceramic-metal cutting tool across the face of the workpiece at a feed rate of up to about 0.04 inches per revolution, and cutting the workpiece with the ceramic-metal cutting tool to effect a depth of cut of up to about 0.15 inches per pass. The ceramic-metal cutting tool has a density of at least about 95% of theoretical, and includes about 80-98% by volume of granular hard phases and about 2-20% by volume of a metal phase. The granular hard phases consist essentially of (a) a major hard phase portion consisting essentially of alumina with about 0-2% by volume of one or more oxides selected from magnesia, zirconia, yttria, hafnia, and silica; and (b) a minor hard phase portion selected from the group consisting of the hard refractory carbides, nitrides, carbonitrides, and borides of metals of Groups 4b, 5b, and 6b of the Periodic Table of the Elements, and combinations thereof. The metal phase consists essentially of (a) a combination of nickel and aluminum having a ratio of nickel to aluminum of from about 80:20 to about 90:10 by weight; and (b) 0-5% by volume of an additive selected from the group consisting of titanium, zirconium, hafnium, vanadium, niobium, tantalum, chromium, molybdenum, tungsten, cobalt, boron, and carbon, and combinations thereof.

In narrower, preferred aspects of the method in accordance with the invention, the metal phase comprises about 4-12% by volume of the cutting tool, and/or the metal phase has a ratio of nickel to aluminum of from about 85:15 to about 88:12 by weight.

In another aspect, the invention is a method as described above wherein the ceramic-metal cutting tool includes about 88-98% by volume of granular hard phases and about 2-12% by volume of a metal phase. The metal phase consists essentially of (a) a combination of nickel and aluminum having a ratio of nickel to aluminum of from about 85:15 to about 88:12 by weight; and (b) 0-5% by volume of the above-described additive. The metal phase is a non-continuous, dispersed metal phase, and at least a major portion of the non-continuous, dispersed metal phase is segregated at triple points defined by grain surfaces of the granular hard phases.

In other narrower, preferred aspects of the methods in accordance with the invention, the metal phase includes a combination of a $Ni_3Al$ ordered crystal structure, or a $Ni_3Al$ ordered crystal structure coexistent with or modified by said additive, and one or more nickel-aluminum alloys. This metal phase combination may include about 40-80% by volume of said $Ni_3Al$ ordered crystal structure, or said $Ni_3Al$ ordered crystal structure coexistent with or modified by said additive.

BRIEF DESCRIPTION OF THE DRAWING

For a better understanding of the present invention, together with other objects, advantages and capabilities thereof, reference is made to the following Description and appended Claims, together with the Drawing, in which:

DETAILED DESCRIPTION OF THE PREFERRED EMBODIMENTS

Figure 1:
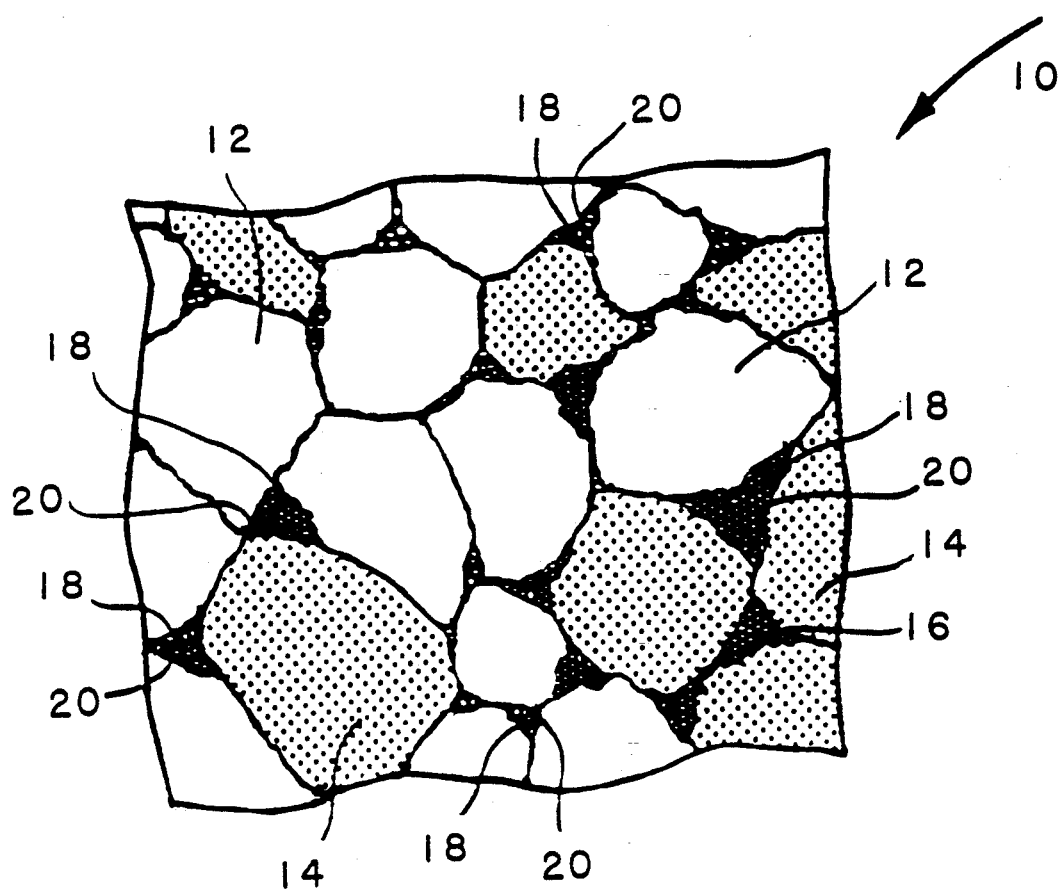
FIG. 1 is a schematic illustration of the microstructure of a cutting tool material useful in a machining method in accordance with one embodiment of the invention, illustrating the segregation of the metal phase at the triple points.

The machining methods described herein utilize fully dense, i.e. to at least 95% of theoretical density, ceramic materials including at least two hard phases, a first hard phase of alumina combined with a second hard phase of one or more refractory carbides, nitrides, carbonitrides, or borides. As used herein, the term "alumina" is intended to mean that the alumina may (or may not) be further modified by or coexist with small amounts, i.e. less than about 5 v/o and preferably only up to about 2 v/o, of magnesia, zirconia, yttria, hafnia, and/or silica. An example of such an addition is the addition of a small amount of MgO as a grain growth inhibiting agent.

Examples of suitable materials for the second phase are the hard refractory carbides, nitrides, carbonitrides, or borides of metals of Groups 4b, 5b, and 6b of the Periodic Table of the Elements, or "combinations", i.e. mixtures and solid solutions, thereof. As used herein, the term "metals of Groups 4b, 5b, and 6b of the Periodic Table of the Elements" is intended to mean titanium, zirconium, hafnium, vanadium, niobium, tantalum, chromium, molybdenum, and tungsten. Carbides or carbonitrides of titanium, hafnium, niobium, tantalum, or tungsten, or combinations thereof, are preferred as the second hard phase material because of their desirable properties, i.e. their hardness and/or fracture toughness and/or low chemical solubility, particularly with respect to superalloy materials. Especially preferred as second hard phase materials are solid solution carbides or carbonitrides of any two of titanium, hafnium, niobium, tantalum, and tungsten, for example tungsten titanium carbides.

The alumina hard phase is present as the major phase in the material, i.e. present in the material in a greater % by volume than any of the remaining phases. The second hard phase is present as a minor phase, i.e. present in the material in a lesser % by volume than the alumina phase. The preferred amount of the alumina phase is about 44–94 v/o; the second phase is present preferably in an effective amount of about 4–44 v/o. For example, carbide content exceeding about 44% can significantly increase the chemical solubility of, e.g., a cutting tool material with respect to nickel and ferrous alloys, resulting in less satisfactory performance; while carbide additions of less than about 4% can result in decreased hardness and toughness, decreasing impact and wear resistance in applications such as milling.

The hard phases coexist with a third, metallic phase combining nickel and aluminum, in an amount of about 2–20 v/o of the starting formulation, preferably about 2–12 v/o, and most preferably about 4–12 v/o.

It is essential for optimization of the method described herein that this third phase include both nickel and aluminum. The metal powder added to the starting formulation includes nickel in an amount of about 80–90 w/o (percent by weight), and preferably about 85–88 w/o, and aluminum in an amount of about 10–20 w/o, and preferably about 12–15 w/o, both relative to the total weight of the metal powder.

The addition of aluminum in an amount of less than about 10 w/o can result in a material of inferior properties. Since nickel does not easily wet alumina, the material becomes more difficult to sinter and the dispersion of the nickel in such a material is poor. Conversely, the addition of aluminum in an amount greater than about 15 w/o can lower the hardness and chemical stability of the material, also resulting in inferior properties. A minor amount of titanium, zirconium, hafnium, vanadium, niobium, tantalum, chromium, molybdenum, cobalt, boron, carbon, or combinations (i.e. mixtures, compounds, or alloys) thereof, not to exceed about 5 w/o of total metal phase, may also be included. The preferred composition for this intermetallic phase is 12–15 w/o Al, balance Ni. In the most preferred composition the Ni:Al ratio results in the formation of a substantially $Ni_3Al$ metal phase, having the $Ni_3Al$ ordered crystal structure. The metal phase may be substantially completely of the $Ni_3Al$ ordered crystal structure, or this phase may be only partially developed and exist in combination with one or more nickel-aluminum alloys. In some compositions, this ordered crystal structure may coexist with or be modified by the above-mentioned additives. Thus, as used herein the term "metal phase" does not necessarily denote a single phase.

The best combination of properties (hardness and fracture toughness) for cutting tools useable for the methods described herein is obtained when total metal addition is in the most preferred range of about 4–12 v/o. The beneficial effect of such low amounts of the intermetallic phase is particularly unexpected, since at such lower amounts this phase is less likely to be acting as a continuous binder for the hard phases in a manner similar to known cermets, e.g. tungsten carbide/cobalt materials.

A preferred microstructure for the ceramic-metal cutting tools described herein is schematically illustrated in FIG. 1. FIG. 1 shows cutting tool material 10, including alumina hard phase 12, titanium carbide hard phase 14, and metal phase 16. The metal phase is dispersed, non-continuous, and substantially segregated at "triple points" of the material, i.e. at points where the surfaces of at least three grains come together or would contact one another if the metallic phase were not present in the fully dense material. FIG. 1 shows metal phase 16 as segregates 18 disposed at triple points 20 between hard phase grains 12 and/or 14.

These finely divided segregates are made up of a combination of Ni-Al alloys with the intermetallic $Ni_3Al$ compound. The segregation is effected by adding nickel and aluminum to the above described material, e.g. an oxide-carbide system, as nickel and aluminum powders rather than as the prereacted $Ni_3Al$ compound. Since nickel and nickel-rich Ni-Al alloys wet alumina poorly, the metal phase tends to segregate at the triple points.

The preferred average grain size (diameter or equivalent diameter) of the hard phases in a densified body of this material for cutting tool use is about 0.5–5.0 $\mu$m; the most preferred, 1–3 $\mu$m. The granular second phase may be present in the form of equiaxed particles or in non-equiaxed form, e.g. whiskers, fibers, or elongated grains, or as a mixture of two or more forms. Preferably, the aspect ratio (length:diameter) of the second phase is between 1:1 and 20:1. The material may be densified by methods known to be suitable for achieving full density in alumina-based materials, for example sintering, continuous cycle sinterhip, two step sinter-plus-HIP, or hot pressing, all known in the art.

For certain applications the cutting tools described herein may be coated with refractory materials to provide certain desired surface characteristics. The preferred coatings have one or more adherent, compositionally distinct layers of refractory metal carbides and/or nitrides, e.g. of titanium, tantalum, or hafnium, and- /or oxides, e.g. of aluminum or zirconium, or combinations of these materials as different layers and/or solid solutions. Especially preferred for the alumina-based material is an alumina coating, because of its inherent compatibility with its substrate, or a chemical vapor deposited (CVD) diamond coating, because of its exceptional hardness. Both alumina and diamond coatings provide exceptional chemical stability, wear resistance, and high hardness at high temperatures.

Combinations of the various coatings described above may be tailored to enhance the overall performance, the combination selected depending on the machining application and the workpiece alloy material. This is achieved, for example, through selection of coating combinations which improve adherence of coating to substrate and coating to coating, as well as through improvement of microstructurally influenced properties of the substrate body. Such properties include hardness, fracture toughness, impact resistance, and chemical inertness of the substrate body.

Such coatings may be deposited by methods such as chemical vapor deposition (CVD) or physical vapor deposition (PVD), and preferably have a total thickness of about 0.5–10 μm. CVD or PVD techniques known in the art to be suitable for coating alumina are preferred for coating the articles described herein.

The novel machining method described herein involves utilizing the above-described cutting tool in machining applications, for example in the machining of high temperature nickel based alloys including those of the type known as superalloys. The following description of the method is directed to an exemplary nickel-based superalloy, Inconel 718, but is also applicable to other high temperature nickel based, iron based, and cobalt based superalloys as well as to other materials, including difficult-to-work materials. As used herein, the term "difficult-to-work" is intended to refer to the machining characteristics of workpiece materials which are significantly more difficult to work than steel, necessitating slow machining speeds, slow feed rates, and/or shallow depth of cut when machined using conventional tungsten carbide-cobalt cutting tools. Such difficult-to-work materials include high temperature nickel based metal alloys, including the type known in the art as superalloys, as well as other difficult-to-work alloys based on iron and cobalt.

The typical turning or milling speed for such high temperature nickel based materials ranges from as low as 5–20 sfm (surface feet per minute), for milling Inconel superalloys with high speed steel tools, to as high as 30–100 sfm, for turning Inconel superalloys with carbide tools (*Materials Engineering / Materials Selector 90, C88 (1979)*), typically tungsten carbide-cobalt tools. Utilization of the abovedescribed alumina ceramic-metal tools, however, permits an unexpectedly large increase in the machining speed, e.g. on the order of one to three orders of magnitude.

In carrying out the method described herein, a bar of Inconel 718 alloy may be turned on a lathe using an alumina ceramic-metal cutting tool as described above. An effective turning speed of up to about 1500 sfm, a feed rate of up to about 0.15 in/rev, and a depth of cut of up to about 0.050 inches may be tolerated by these cutting tools. For example, at a turning speed of about 1500 sfm, a feed rate of up to about 0.015 in/rev and a depth of cut of up to about 0.050 inches is possible. Alternatively, the method may involve milling, drilling, tapping, reaming, broaching, grooving, threading, or other machining operation using a cutting tool material as described herein. Some of these machining methods may involve lower turning speeds, for example tapping may be performed at up to about 100 sfm. Also alternatively, the workpiece may be another material, including those which are similarly difficult to machine.

The following Examples are presented to enable those skilled in the art to more clearly understand and practice the present invention These Examples should not be considered as a limitation upon the scope of the present invention, but merely as being illustrative and representative thereof.

EXAMPLES 1–5

Cutting tools were prepared from a powder mixture of 8% by volume metal (86.7% Ni, 13.3% Al, both by weight, corresponding to a $Ni_3Al$ stoichiometric ratio), 27.6% by volume refractory carbide, balance alumina as follows:

A charge of the required ratio of nickel, aluminum, and solid solution tungsten titanium carbide (referred to below as (W,Ti)C) was milled with a small amount of excess carbon and sufficient heptane to create a flowable slurry in a tungsten carbide attritor mill using cemented carbide (WC-Co) milling media for 1 hr at 120 rpm. The ratio of tungsten to titanium in the carbide solid solution was 50:50. A first batch (I) was compounded with 3.5 μm carbide powder (average grain diameter) and a second batch (II) with 1.3 μm carbide powder. The required amount of $Al_2O_3$ powder was then added to the charge, which was further milled for 1 hr. The alumina powder included 0.05% by weight MgO.

After milling, the powder was separated from the milling media by washing with additional heptane through a stainless steel screen. The excess heptane was slowly evaporated. To prevent inhomogeneity, the thickened slurry was mixed continuously during evaporation, and the caking powder broken up with a plastic spatula into small, dry granules. The dry granules were then sieved through an 80-mesh screen.

Dense compacts were prepared from the screened powder by densification using a hot pressing technique. A 1.75 inch diameter boron nitride washed die was charged with the screened powder mixture of Batch I, and was hot pressed at 1550° C. for 30 min at 31.1 MPa, then oven cooled to room temperature. The material was then removed from the die. The densification process was repeated for the Batch II powder.

The machining performance in turning of Inconel 718 of tools prepared as described above was compared to that of prior art cutting tools of similar geometry. The prior art tools were: Example 1—a commercially available alumina-based composite ceramic tool including a nominal 30% by volume titanium carbide powder; Example 2—a commercially available alumina-based composite ceramic tool including approximately 30% by volume silicon carbide whiskers; Example 3—a commercially available ceramic-metal tool. The feed rate was 0.006 in/rev; the depth of cut, 0.040 inches per pass. The nose wear and notch wear, each in inches of wear per cubic inch of workpiece material removed, for each tool at cutting speeds of 600 and 800 ft/min are shown in the Table below.

TABLE

| Ex. | Tool Composition | Nose Wear, in/in³, @ 600/800 ft/min | Notch Wear, in/in³, @ 600/800 ft/min |
|---|---|---|---|
| 1* | Al₂O₃ + 30 v/o** TiC Commercial Grade | 0.02/0.04170 | 2.660/*** |
| 2* | Al₂O₃ + v/o SiC (whisker) Commercial Grade | 0.00228/0.00326 | 0.011/0.013 |
| 3* | Cermet Tool | 0.87/1.34 | */* |
| 4 | Batch I: Al₂O₃ + 27.6 v/o (W,Ti)C (3.5 μm powder) + 8 v/o (Ni,Al) | 0.00174/0.00456 | 0.015/0.010 |
| 5 | Batch II: Al₂O₃ + 27.6 v/o (W,Ti)C (1.3 μm powder) + 8 v/o (Ni,Al) | 0.00235/0.00282 | 0.023/0.014 |

*Comparative example.
**v/o = percent by volume.
***Tool fractured.

As can be seen from the test results shown in the Table, the methods described herein, using the above-described alumina ceramic-metal cutting tools, exhibit superior tool wear characteristics and fracture resistance when compared to methods using commercially available alumina-TiC and ceramic-metal cutting tools. These methods also provide at least equal performance when compared to methods using commercially available whisker reinforced ceramic composite tools. Thus, the present invention provides novel improved machining methods, even at high speed, for difficult-to-work high temperature nickel based alloys and other difficult-to-work materials, using cutting tools which are readily fabricated from materials which are easy to handle.

EXAMPLE 6

Cutting tools are prepared from a powder mixture of 2% by volume metal (86.7% Ni, 13.3% Al, both by weight), 30% by volume refractory carbide, remainder alumina, by the fabrication method described above for Examples 1-5. The alumina powder includes 0.05% by weight MgO. The cutting tools are used in high speed turning at 1500 ft/min of Incoloy 909 at a feed rate of 0.02 in/rev and depth of cut of 0.05 inches per pass.

EXAMPLE 7

Cutting tools are prepared from a powder mixture of 20% by volume metal (86.7% Ni, 13.3% Al, both by weight), 25% by volume refractory carbide, remainder alumina, by the fabrication method described above for Examples 1-5. The alumina powder includes 0.05% by weight MgO. The cutting tools are used in grooving at 200 ft/min of Inconel 718 at a feed rate of 0.01 in/rev and depth of cut of 0.10 inches per pass.

Although the specific Examples described above pertain specifically to turning operations, those skilled in the art will readily recognize that the present invention also applies to other machining operations, for example milling, drilling, tapping, reaming, broaching, grooving, or threading, as well. While there have been shown and described what are at present considered the preferred embodiments of the invention, it will be obvious to those skilled in the art that various changes and modifications can be made therein without departing from the scope of the invention as defined by the appended Claims.

We claim:

1. A method for machining comprising the steps of: machining a workpiece at an effective cutting speed of up to about 1500 surface feet per minute; moving a ceramic-metal cutting tool across the face of said workpiece at a feed rate of up to about 0.04 inches per revolution; and cutting said workpiece with said ceramic-metal cutting tool to effect a depth of cut of up to about 0.15 inches per pass;

wherein said ceramic-metal cutting tool has a density of at least about 95% of theoretical, and comprises about 80-98% by volume of granular hard phases consisting essentially of:

a major hard phase portion consisting essentially of alumina with about 0-2% by volume of one or more oxides selected from the group consisting of magnesia, zirconia, yttria, hafnia, and silica; and a minor hard phase portion selected from the group consisting of the hard refractory carbides, nitrides, carbonitrides, and borides of metals of Groups 4b, 5b, and 6b of the Periodic Table of the Elements, and combinations thereof;

and about 2-20% by volume of a metal phase consisting essentially of:

a combination of nickel and aluminum having a ratio of nickel to aluminum of from about 80:20 to about 90:10 by weight; and 0-5% by volume of an additive selected from the group consisting of titanium, zirconium, hafnium, vanadium, niobium, tantalum, chromium, molybdenum, tungsten, cobalt, boron, and carbon, and combinations thereof.

2. A method in accordance with claim 1 wherein said cutting speed is up to about 1000 surface feet per minute.

3. A method in accordance with claim 1 wherein said cutting speed is up to about 800 surface feet per minute.

4. A method in accordance with claim 3 wherein said feed rate is up to about 0.02 inches per revolution.

5. A method in accordance with claim 4 wherein said feed rate is up to about 0.006 inches per revolution.

6. A method in accordance with claim 3 wherein said depth of cut is up to about 0.05 inches per pass.

7. A method in accordance with claim 6 wherein said depth of cut is up to about 0.04 inches per pass.

8. A method in accordance with claim 1 wherein said metal phase comprises about 4-12% by volume of said cutting tool.

9. A method in accordance with claim 1 wherein said metal phase has a ratio of nickel to aluminum of from about 85:15 to about 88:12 by weight.

10. A method in accordance with claim 1 wherein said metal phase comprises a combination of a Ni₃Al ordered crystal structure, or a Ni₃Al ordered crystal structure coexistent with or modified by said additive, and one or more nickel-aluminum alloys.

11. A method in accordance with claim 10 wherein said metal phase combination comprises about 40-80% by volume of said Ni₃Al ordered crystal structure, or said Ni₃Al ordered crystal structure coexistent with or modified by said additive.

12. A method in accordance with claim 1 wherein said minor hard phase portion comprises a hard refractory carbide or carbonitride of titanium, hafnium, niobium, tantalum, or tungsten, or combination thereof.

13. A method in accordance with claim 12 wherein said minor hard phase portion comprises a hard refractory solid solution tungsten titanium carbide.

14. A method in accordance with claim 12 wherein said minor hard phase portion has an average grain size of about 3.5 μm.

15. A method in accordance with claim 12 wherein said minor hard phase portion has an average grain size of about 1.3 μm.

16. A method in accordance with claim 12 wherein said minor hard phase portion has an average aspect ratio between 1:1 and about 20:1.

17. A method in accordance with claim 1 wherein said cutting tool is coated with one or more adherent, compositionally distinct layers, each layer being a material or solid solution of materials selected from the group consisting of carbides, nitrides, and carbonitrides of titanium, tantalum, and hafnium; oxides of aluminum or zirconium; or diamond.

18. A method for machining comprising the steps of: machining a workpiece at an effective cutting speed of up
 to about 1500 surface feet per minute; moving a ceramic-metal cutting tool across the face of
 said workpiece at a feed rate of up to about 0.04 inches per revolution; and cutting said workpiece with said ceramic-metal cutting
 tool to effect a depth of cut of up to about 0.15 inches per pass;
wherein said ceramic-metal cutting tool has a density of at least about 95% of theoretical, and comprises about 88-98% by volume of granular hard phases consisting essentially of:
 a major hard phase portion consisting essentially of alumina with about 0-2% by volume of one or more oxides selected from the group consisting of magnesia, zirconia, yttria, hafnia, and silica; and
 a minor hard phase portion selected from the group consisting of the hard refractory carbides, nitrides, carbonitrides, and borides of metals of Groups 4b, 5b, and 6b of the Periodic Table of the Elements, and combinations thereof;
and about 2-12% by volume of a metal phase consisting essentially of:
 a combination of nickel and aluminum having a ratio of nickel to aluminum of from about 85:15 to about 88:12 by weight; and
 0-5% by volume of an additive selected from the group consisting of titanium, zirconium, hafnium, vanadium, niobium, tantalum, chromium, molybdenum, tungsten, cobalt, boron, and carbon, and combinations thereof;
and wherein:
 said metal phase is a non-continuous, dispersed metal phase; and
 at least a major portion of said non-continuous, dispersed metal phase is segregated at triple points defined by grain surfaces of said granular hard phases.

19. A method in accordance with claim 18 wherein said metal phase comprises about 4-12% by volume of said cutting tool.

20. A method in accordance with claim 18 wherein said metal phase comprises a combination of a $Ni_3Al$ ordered crystal structure, or $Ni_3Al$ ordered crystal structure coexistent with or modified by said additive, and one or more nickel-aluminum alloys.

21. A method in accordance with claim 20 wherein said metal phase combination comprises about 40-80% by volume of said $Ni_3Al$ ordered crystal structure, or said $Ni_3Al$ ordered crystal structure coexistent with or modified by said additive.

22. A method for machining a high temperature, nickel-based alloy workpiece comprising the steps of:
 turning said workpiece on a lathe at an effective cutting speed of up to about 1500 surface feet per minute;
 moving a ceramic-metal cutting tool across the face of said workpiece at a feed rate of up to about 0.04 inches per revolution; and
 cutting said workpiece with said ceramic-metal cutting tool to effect a depth of cut of up to about 0.15 inches per pass;
wherein said ceramic-metal cutting tool has a density of at least about 95% of theoretical, and comprises:
 about 44-92% by volume of a granular first hard phase consisting essentially of alumina and about 0-2% by volume of one or more oxides selected from the group consisting of magnesia, zirconia, yttria, hafnia, and silica;
 about 4-44% by volume of a granular second hard phase selected from the group consisting of the hard refractory carbides and carbonitrides of titanium, hafnium, niobium, tantalum, and tungsten, and combinations thereof; and
 about 4-12% by volume of a metal phase consisting essentially of a combination of nickel and aluminum having a ratio of nickel to aluminum of from about 85:15 to about 88:12 by weight and 0-5% by volume of an additive selected from the group consisting of titanium, zirconium, hafnium, vanadium, niobium, tantalum, chromium, molybdenum, tungsten, cobalt, boron, and carbon, and combinations thereof;
and wherein:
 said metal phase is a non-continuous, dispersed metal phase; and
 at least a major portion of said non-continuous, dispersed metal phase is segregated at triple points defined by grain surfaces of said granular first and second hard phases.

23. A method in accordance with claim 22 wherein said metal phase comprises a combination of a $Ni_3Al$ ordered crystal structure, or a $Ni_3Al$ ordered crystal structure coexistent with or modified by said additive, and one or more nickel-aluminum alloys; and wherein said metal phase combination comprises about 40-80% by volume of said $Ni_3Al$ ordered crystal structure, or said $Ni_3Al$ ordered crystal structure coexistent with or modified by said additive.

24. A method in accordance with claim 22 wherein said granular second hard phase comprises a hard refractory solid solution tungsten titanium carbide.

* * * * *